US011081309B2

(12) United States Patent
Harrington et al.

(10) Patent No.: US 11,081,309 B2
(45) Date of Patent: Aug. 3, 2021

(54) LIGHT BULB REMOVING AND INSTALLING ASSEMBLIES

(71) Applicant: Unger Marketing International, LLC, Bridgeport, CT (US)

(72) Inventors: William Harrington, Charlestown, RI (US); Robert F. Smith, Waterbury, CT (US); James M. Buckley, New Hartford, CT (US); Paul Adams, Monroe, CT (US); James Markland, Bridgeport, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 151 days.

(21) Appl. No.: 15/958,732

(22) Filed: Apr. 20, 2018

(65) Prior Publication Data

US 2018/0308654 A1 Oct. 25, 2018

Related U.S. Application Data

(60) Provisional application No. 62/488,397, filed on Apr. 21, 2017.

(51) Int. Cl.
*H01J 9/00* (2006.01)
*F16B 47/00* (2006.01)
*B25B 11/00* (2006.01)
*H01K 3/32* (2006.01)

(52) U.S. Cl.
CPC ............ *H01J 9/003* (2013.01); *B25B 11/007* (2013.01); *F16B 47/00* (2013.01); *F16B 47/006* (2013.01); *H01K 3/32* (2013.01)

(58) Field of Classification Search
CPC ......... H01J 9/003; H01K 3/32; B25B 11/007; B25B 21/002; F16B 7/00; F16B 47/0006; B25G 1/04
USPC ................................................ 81/53.11, 53.1
See application file for complete search history.

(56) References Cited

U.S. PATENT DOCUMENTS

| 697,961 A | 4/1902 | Ainsworth |
|---|---|---|
| 1,056,084 A | 3/1913 | Bates |
| 1,831,477 A | 11/1931 | Birong |
| 4,663,996 A | 5/1987 | Grudgfield |

(Continued)

FOREIGN PATENT DOCUMENTS

JP 4759714 B2 * 8/2011

OTHER PUBLICATIONS

Machine Translation of JP4759714 (Year: 2011).*
Mr. Long Arm Smart Bulb Changers product sheet.

*Primary Examiner* — Orlando E Aviles
*Assistant Examiner* — Robert F Neibaur
(74) *Attorney, Agent, or Firm* — Cantor Colburn LLP

(57) ABSTRACT

Light bulb removing and installing assemblies are provided that can be easily configured for use with light bulbs different sizes and/or shapes. The assembly can include at least two different types of bulb holding devices that are removably connected to one another in a nested manner. The assembly can include bulb holding devices of different sizes that have an open bottom, which is removably connectable to a common base. The assembly can include a resilient finger holder and a common base, where the common base includes a number of upstanding, radially directed flexible members.

15 Claims, 15 Drawing Sheets

(56) References Cited

U.S. PATENT DOCUMENTS

| | | | |
|---|---|---|---|
| 5,103,695 A * | 4/1992 | Dolle | H01J 9/006 |
| | | | 81/124.4 |
| 5,317,939 A | 6/1994 | Marinescu | |
| 5,436,526 A | 7/1995 | Hohaus | |
| 5,458,029 A | 10/1995 | Walsky | |
| 5,490,438 A | 2/1996 | Zupo | |
| 6,223,628 B1 | 5/2001 | Barron | |
| 6,260,442 B1 * | 7/2001 | Bayat | H01J 9/003 |
| | | | 81/441 |
| 6,883,400 B2 | 4/2005 | Sugano | |
| 6,928,901 B1 | 8/2005 | Rainin | |
| 7,131,352 B1 * | 11/2006 | Saunders | H01J 9/003 |
| | | | 81/53.11 |
| 7,143,668 B2 | 12/2006 | Johnson | |
| 7,631,579 B2 * | 12/2009 | Johnson | H01J 9/003 |
| | | | 81/53.12 |
| 7,775,490 B2 | 8/2010 | Kawabata | |
| 7,837,163 B2 | 11/2010 | Takahashi | |
| 7,841,568 B2 | 11/2010 | Takahashi | |
| 7,856,907 B2 | 12/2010 | Johnson | |
| 7,913,345 B2 | 3/2011 | Dayton | |
| 7,926,141 B2 | 4/2011 | Dayton | |
| 8,096,026 B2 | 1/2012 | Bevirt | |
| 8,104,380 B2 | 1/2012 | Johnson | |
| 8,256,329 B2 | 9/2012 | Ota | |
| 8,448,546 B2 | 5/2013 | Johnson | |
| 8,453,540 B2 | 6/2013 | Ellis | |
| 8,539,863 B2 | 9/2013 | Gatski | |
| 8,555,749 B2 | 10/2013 | Gatski | |
| 8,783,136 B2 | 7/2014 | Workman | |
| 8,783,634 B2 | 7/2014 | Summers | |
| 8,869,655 B2 | 10/2014 | Johnson | |
| 8,973,877 B2 | 3/2015 | Chen | |
| 9,056,393 B1 | 6/2015 | Gary | |
| 9,070,544 B1 * | 6/2015 | Shaps | H01K 3/32 |
| D745,347 S | 12/2015 | Gurwicz | |
| 10,429,040 B2 * | 10/2019 | Gurwicz | H01J 9/003 |
| 2007/0154254 A1 | 7/2007 | Bevirt | |
| 2008/0035807 A1 | 2/2008 | Bevirt | |
| 2008/0217493 A1 | 9/2008 | Bevirt | |
| 2008/0230661 A1 | 9/2008 | Kawabata | |
| 2009/0184220 A1 | 7/2009 | Takahashi | |
| 2009/0194651 A1 | 8/2009 | Takahashi | |
| 2013/0168523 A1 | 7/2013 | Summers | |
| 2013/0213186 A1 | 8/2013 | Gatski | |
| 2013/0213187 A1 | 8/2013 | Gatski | |
| 2014/0027588 A1 | 1/2014 | Chen | |

\* cited by examiner

LIGHT BULB REMOVING AND INSTALLING ASSEMBLIES

CROSS REFERENCE TO RELATED APPLICATIONS

This application claims the benefit of U.S. Provisional Application Ser. No. 62/488,397, filed Apr. 21, 2017 the contents of which are incorporated by reference herein.

BACKGROUND

1. Field of the Invention

The present disclosure is related to light bulb removing and installing assemblies. More particularly, the present disclosure is related to assemblies that are configured to easily accommodate light bulbs of a number of different sizes and/or shapes.

2. Description of Related Art

Common residential and commercial lighting devices consist of a socket that has a replaceable light bulb threadably received in the socket. Such lighting devices are ubiquitous and require replaceable light bulbs that have different sizes and/or shapes, which vary depending on a number of different factors.

The different sizes and/or shapes of the light bulbs can become problematic during the routine replacement of the bulbs, particularly when the location of the socket is in an elevated location such as on a wall or ceiling. A number of different prior art devices have been proposed to accommodate light bulbs of different sizes and/or shapes. Generally, these devices include a bulb gripper on an extension pole, where the bulb gripper can grip or hold a bulb with a gripping force such that rotation of the extension pole applies a rotational force to the bulb so that the bulb is threadably secured to and/or unsecured from the socket. As used herein, the term "gripping force" refers to the force applied by the device to temporarily hold the bulb in a desired position before/after installation, while the term "rotational force" refers to the application of torque to the bulb during installation. The prior art devices can apply the gripping and rotational forces using the same or different portions.

However, it has been determined by the present disclosure there is a continuing need for light bulb removing and installing assemblies that overcome, alleviate, and/or mitigate one or more of deficiencies of prior art devices.

SUMMARY

In some embodiments, a light bulb removing and installing assembly is provided that includes at least two different types of bulb holding devices that are removably connected to one another in a nested manner. The bulb holding devices can include one or more of a broken bulb holder, a resilient finger holder, and a suction holder.

In other embodiments either alone or in combination with the afore or aft mentioned embodiments, a light bulb removing and installing assembly is provided that includes at least two resilient finger holders of different sizes and/or shapes. Each of the resilient finger holders has an open base with a number of resilient fingers that are configured to apply a gripping force to a light bulb. The open base of each of the finger holders can be removably connected to a common gripping base. The common gripping base can have an additional gripping feature configured to supplement the gripping force of the resilient finger holders. The additional gripping feature can be a feature selected from the group consisting of an adhesive member, a friction member, a suction member, and any combinations thereof.

In still other embodiments either alone or in combination with the afore or aft mentioned embodiments, a light bulb removing and installing assembly is also provided that includes a resilient finger holder and a gripping base. The resilient finger holder has a number of resilient fingers that are configured to apply a gripping force to a light bulb. The gripping base has an additional gripping feature configured to supplement the gripping force of the resilient finger holders. The additional gripping feature includes a number of upstanding, radially directed flexible members.

A light bulb removing and installing assembly is provided that includes two bulb holding devices of different sizes and/or shapes that are removably connected to one another in a nested manner.

A light bulb removing and installing assembly is also provided that includes two bulb holding devices of different sizes and/or shapes and a common base removably connectable to each bulb holding device. Each bulb holding device has a portion configured to apply at least a gripping force to the light bulb and at least one of the portion and the common gripping base applies a rotational force to the light bulb.

In still other embodiments either alone or in combination with the afore or aft mentioned embodiments, the common base has an open bottom. The common base is removably connectable to each bulb holding device so that the common base applies the rotational force through the open bottom.

In still other embodiments either alone or in combination with the afore or aft mentioned embodiments, the assembly further includes a pole securable to the common base.

In still other embodiments either alone or in combination with the afore or aft mentioned embodiments, the common base is removably connected to a handle in a manner that prevents rotation of the handle and the common base with respect to one another about a longitudinal axis (A).

In still other embodiments either alone or in combination with the afore or aft mentioned embodiments, the handle has a middle region and a top region. The middle region receives a hand of a user and the top region connects the handle to the common base.

In still other embodiments either alone or in combination with the afore or aft mentioned embodiments, the assembly further includes a pole and the handle further includes a bottom region that secures the common base to the pole in a manner that prevents rotation of the handle and the pole with respect to one another about the longitudinal axis (A).

In still other embodiments either alone or in combination with the afore or aft mentioned embodiments, the top region has a broken bulb holder that nests into the common base when the handle and the common base are removably connected to one another.

In still other embodiments either alone or in combination with the afore or aft mentioned embodiments, the broken bulb holder has a pair of resilient teeth having crenulations and a filament gap positioned between the pair of resilient teeth.

In still other embodiments either alone or in combination with the afore or aft mentioned embodiments, the top region has as a widened region around the broken bulb holder so as to capture or catch glass or debris from a broken bulb.

In still other embodiments either alone or in combination with the afore or aft mentioned embodiments, the common base has a feature that provides at least a portion of the rotational force to the light bulb.

In still other embodiments either alone or in combination with the afore or aft mentioned embodiments, the feature conforms to a curvature of the light bulb.

In still other embodiments either alone or in combination with the afore or aft mentioned embodiments, the feature has a plurality of upstanding flexible members. The upstanding flexible members can be linear members that are radially directed inward towards a longitudinal axis or concentric circles having differing heights as the concentric circles approach the longitudinal axis.

In still other embodiments either alone or in combination with the afore or aft mentioned embodiments, the feature is selected from the group consisting of an adhesive member, a frictional member, a suction cup member, a plurality of upstanding flexible members, and any combinations thereof.

In still other embodiments either alone or in combination with the afore or aft mentioned embodiments, the open bottom of one of the two bulb holding devices is removably connected to the other of the two bulb holding devices in a nested manner.

In still other embodiments either alone or in combination with the afore or aft mentioned embodiments, the open bottom of one of the two bulb holding devices has a surface that forms a removable connection with a surface of the other of the two bulb holding devices.

In still other embodiments either alone or in combination with the afore or aft mentioned embodiments, the bulb holding devices are holders selected from the group consisting of a resilient finger holder having a number of resilient fingers, a suction holder, a broken bulb holder, and any combinations thereof.

A light bulb removing and installing assembly is also provided that includes a resilient finger holder and a common base. The resilient finger holder has a number of resilient fingers that apply at least a gripping force to the light bulb. The common base is removably connected to the resilient finger holder and has a feature that applies at least part of a rotational force to the light bulb.

In still other embodiments either alone or in combination with the afore or aft mentioned embodiments, the feature is selected from the group consisting of an adhesive member, a frictional member, a suction cup member, a plurality of upstanding flexible members, and any combinations thereof.

In still other embodiments either alone or in combination with the afore or aft mentioned embodiments, the common base and the resilient finger holder removably connect the resilient finger holder and at least one other bulb holding device to one another in a nested manner.

The above-described and other features and advantages of the present disclosure will be appreciated and understood by those skilled in the art from the following detailed description, drawings, and appended claims.

DETAILED DESCRIPTION

Figure 1:
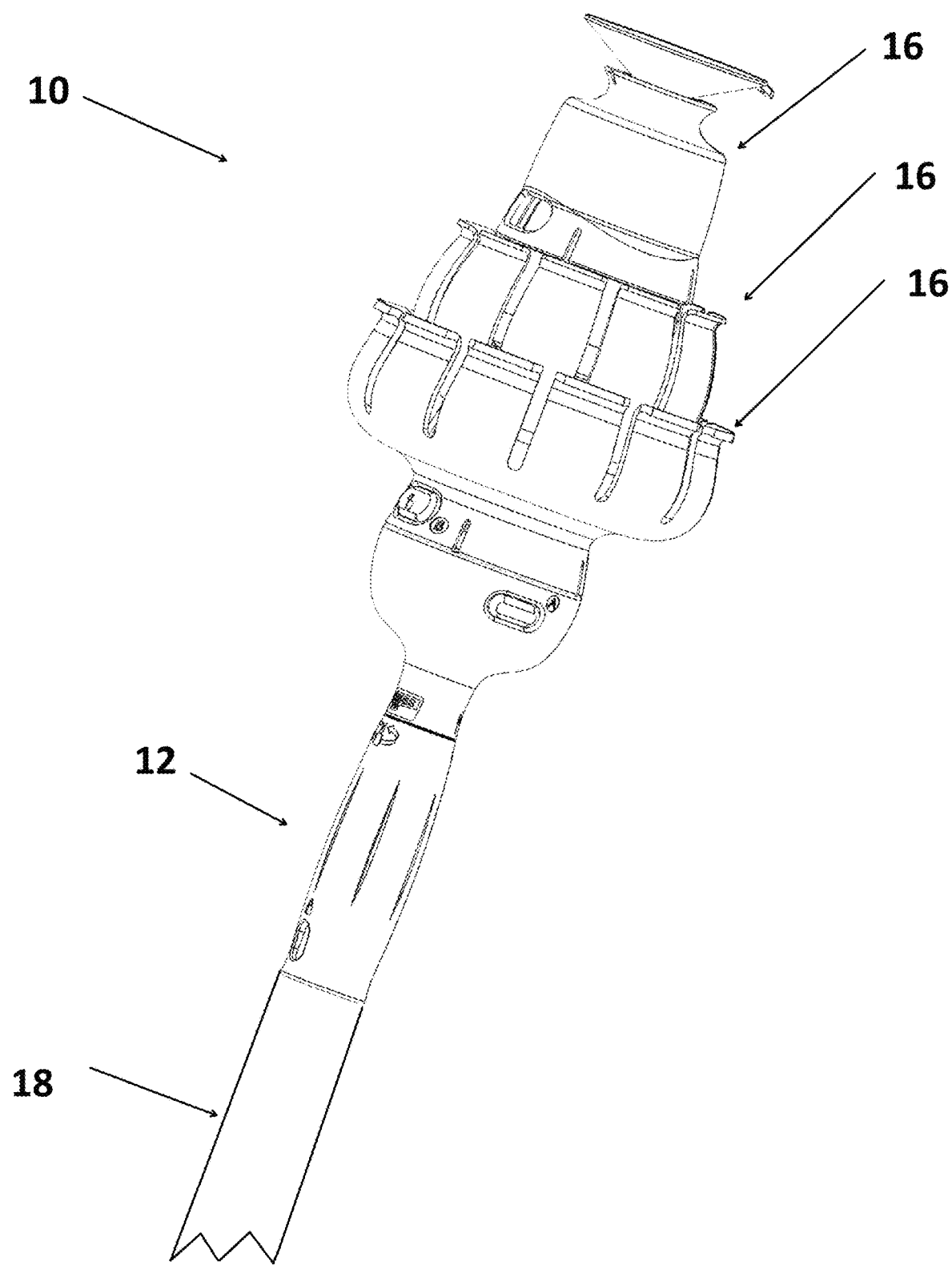
FIG. 1 is a side perspective view of an exemplary embodiment of a light bulb removing and installing assembly according to the present disclosure.

Referring to the drawings and in particular to FIG. 1, an exemplary embodiment of a light bulb removing and installing assembly according to the present disclosure is shown and is generally referred to by reference numeral 10. Assembly 10 is shown in a storage state in FIG. 1, in a disassembled state in FIG. 2, and in various use states in FIGS. 3 and 5-8.

Advantageously, assembly 10 is configured for use with light bulbs (not shown) of different sizes and/or shapes through the attachment of a handle 12, a common base 14, one or more of a number of different types of bulb holding devices 16, and, optionally an extension pole 18.

In some embodiments, extension pole 18 and handle 12 are secured to one another in a manner that prevents rotation of the handle with respect to the pole about a longitudinal axis (A) of the assembly. For example, it is contemplated by the present disclosure for assembly 10 include a locking cone (not shown) such as those commercially available from Applicant, one embodiment of which are shown and described in U.S. Pat. No. 7,413,366, which is incorporated by reference herein. Of course, it is contemplated by the present disclosure for assembly 10 to have any other rotational or non-rotational connection devices.

Of course, it is contemplated by the present disclosure for assembly 10 to have common base 14 that is connectable directly to pole 18.

Assembly 10 is configured to removably secure two or more of the holding devices 16 to one another in a nested manner in the storage state. Additionally, assembly 10 is configured, in some embodiments, to removably secure base 14 and one holding device 16 in a nested manner during use.

Handle 12 includes a bottom region 20, a middle region 22, and a top region 24. Bottom region 20 is configured to secure assembly 10 to pole 18, allowing assembly 10 to be used at extended heights. Middle region 22 is configured to receive the hand of a user to allow direct use of assembly 10. Top region 24 is configured to connect handle 12 to common base 14.

Figure 2:
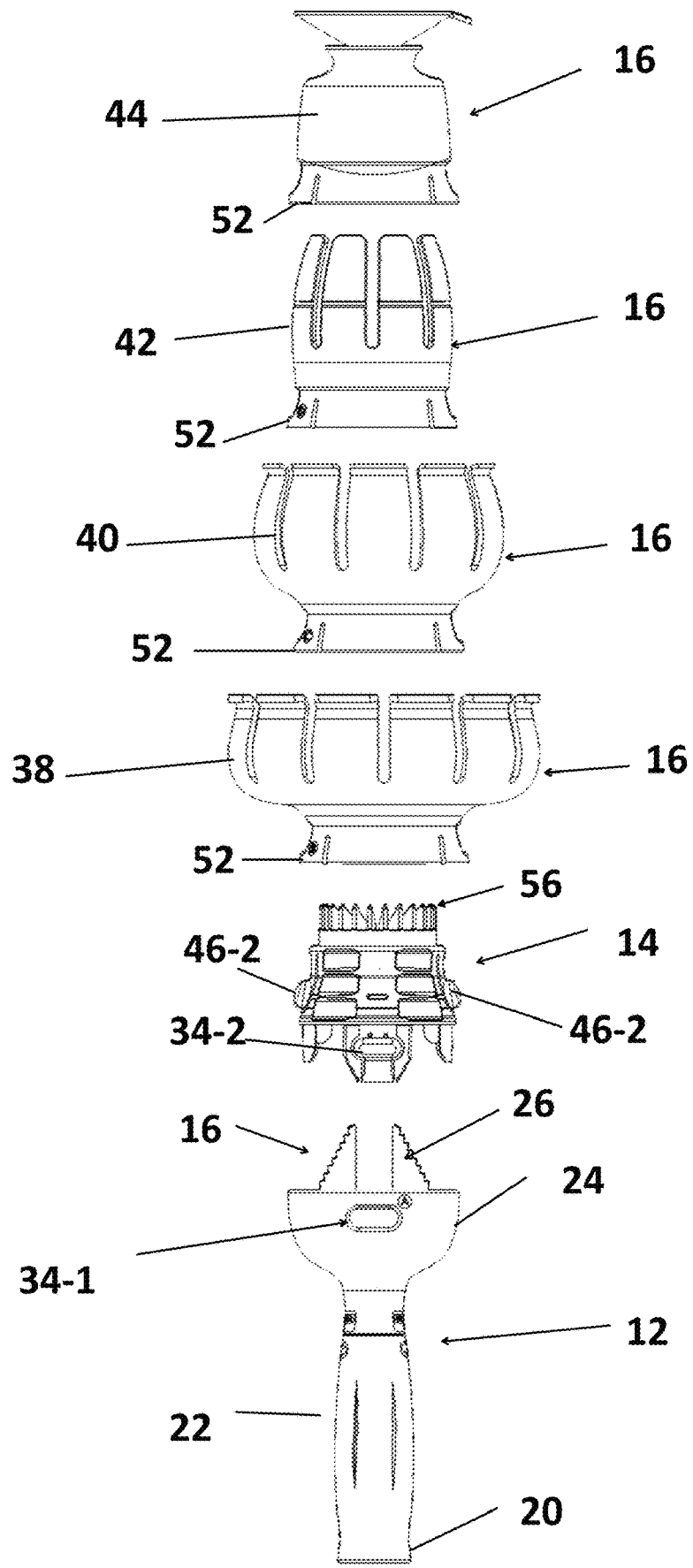
FIG. 2 is a disassembled view of the assembly of FIG. 1.
Figure 3:
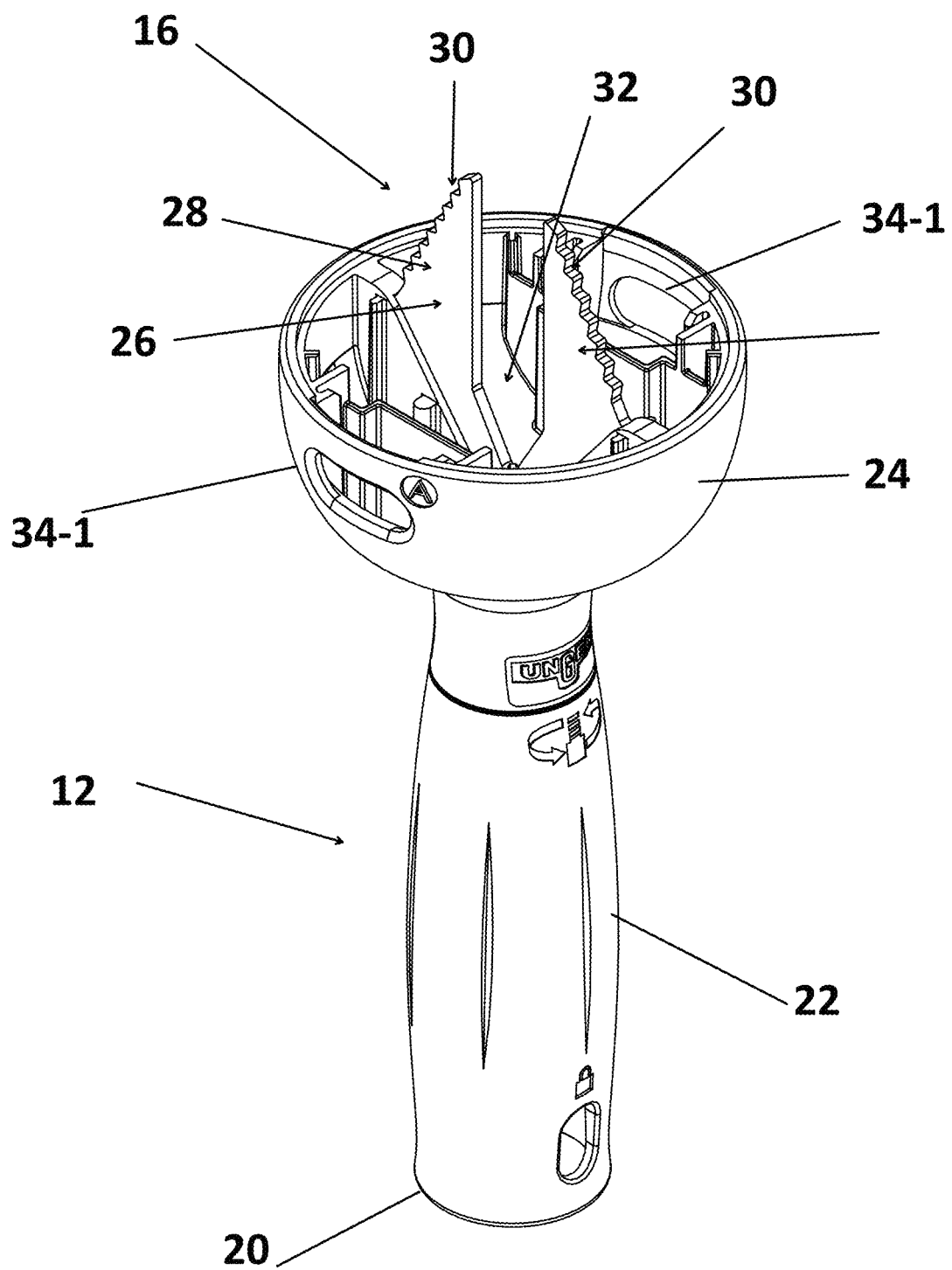
FIG. 3 is a top perspective view of the assembly of FIG. 1 configured for use with a broken bulb holder.
Figure 4:
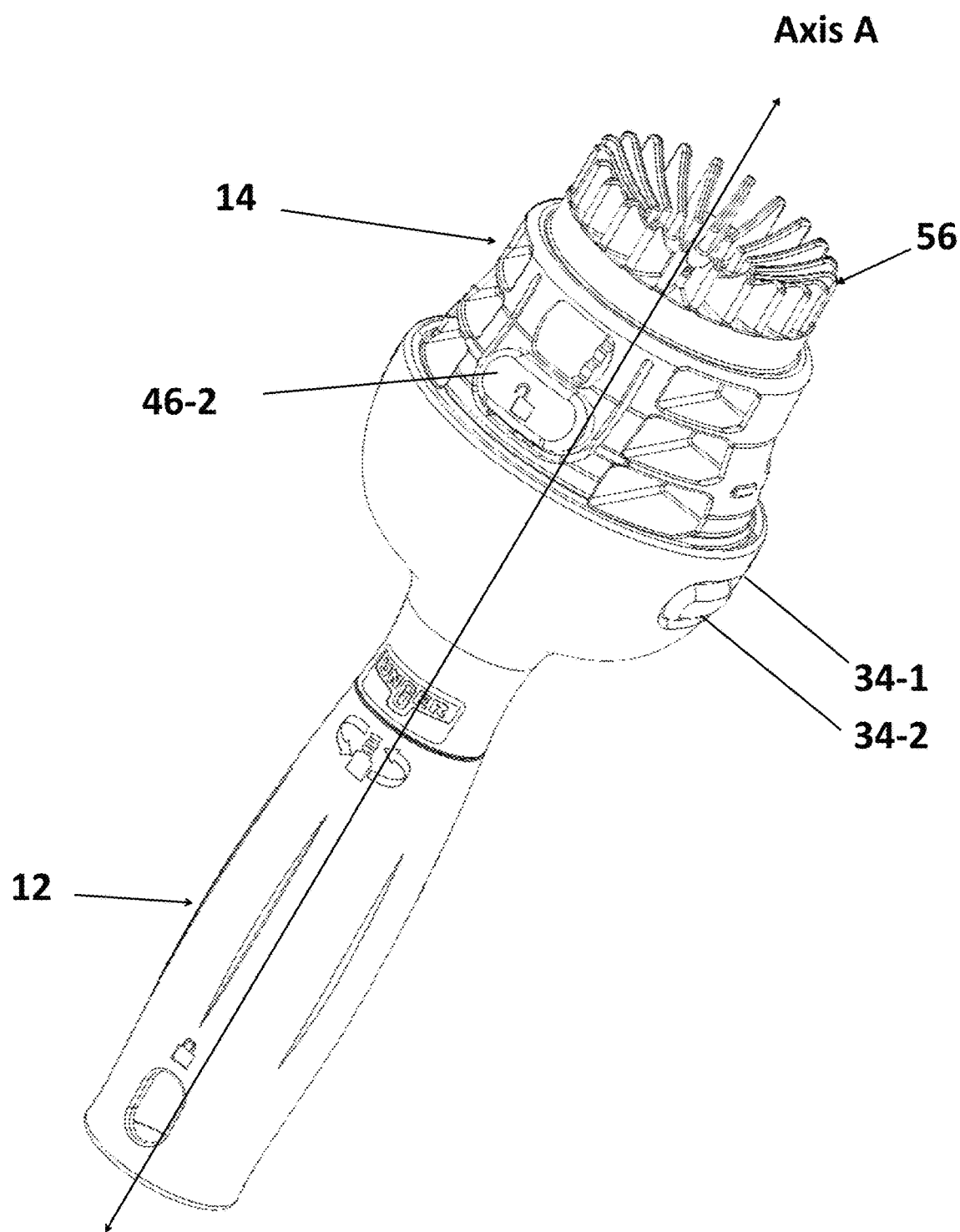
FIG. 4 is a top perspective view of the assembly of FIG. 1 configured for use with a resilient finger holder but before assembly.
Figure 5:
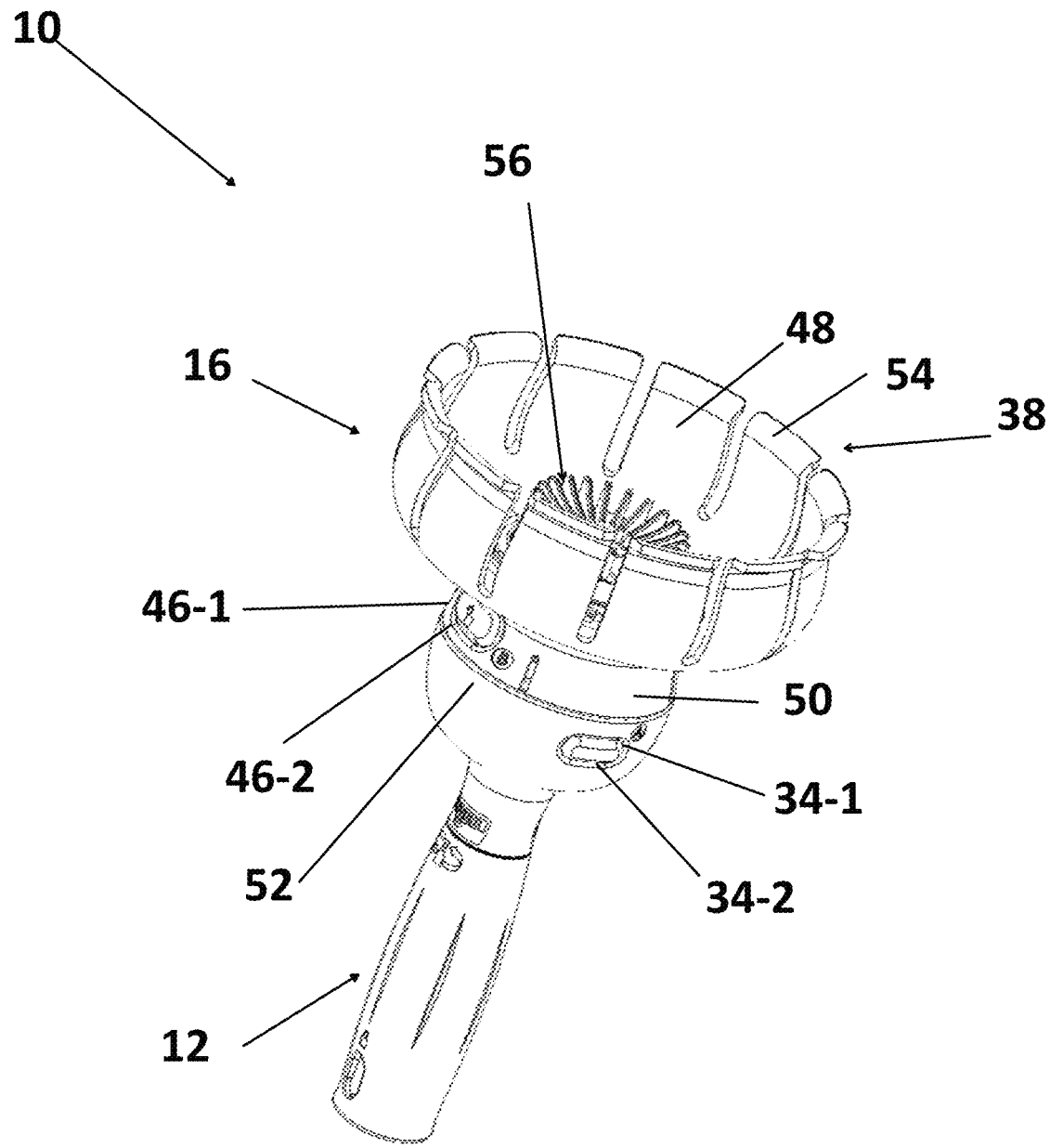
FIG. 5 is a top perspective view of the assembly of FIG. 4 in use with a first resilient finger holder.
Figure 6:
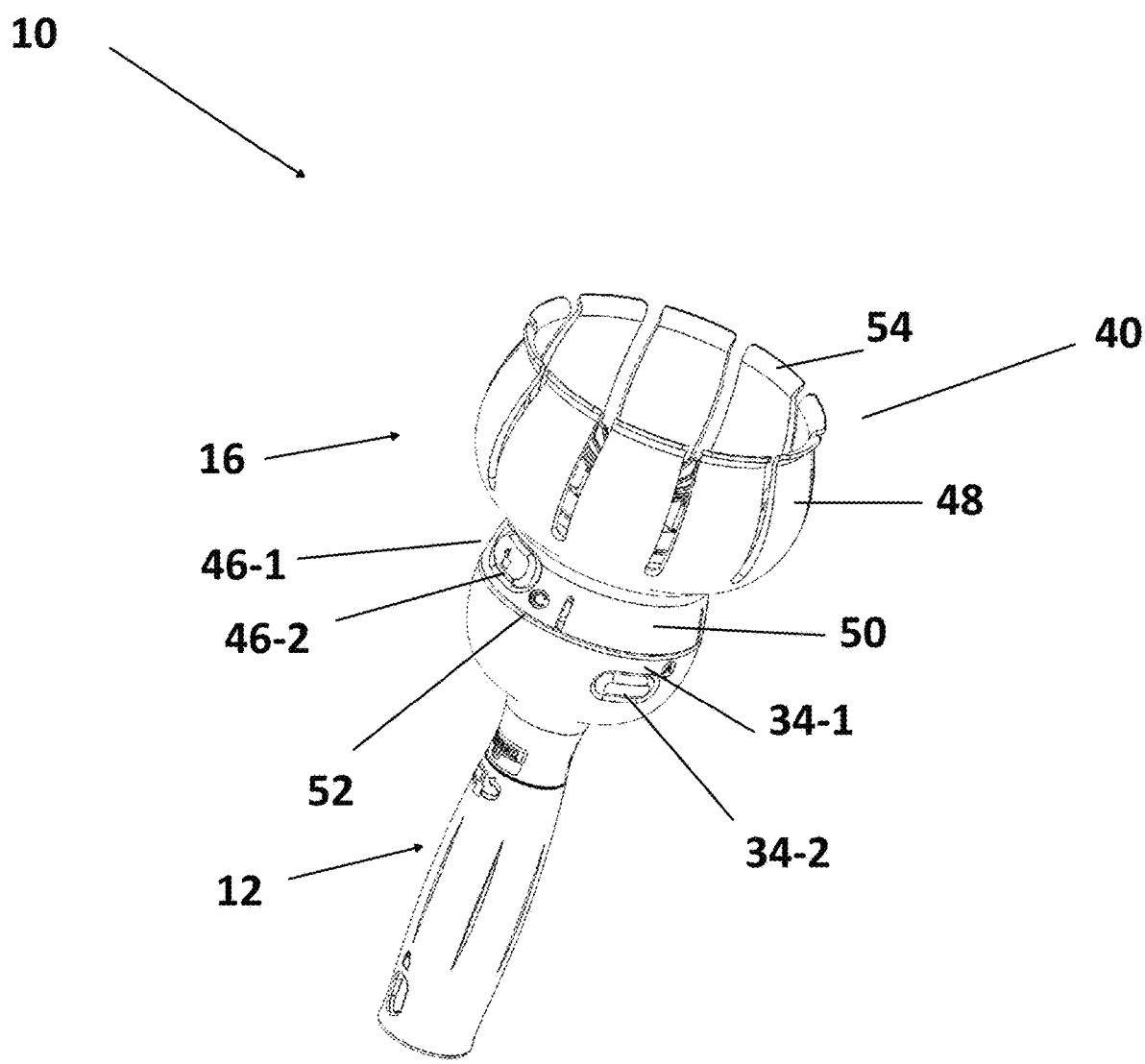
FIG. 6 is a top perspective view of the assembly of FIG. 4 in use with a second resilient finger holder.
Figure 7:
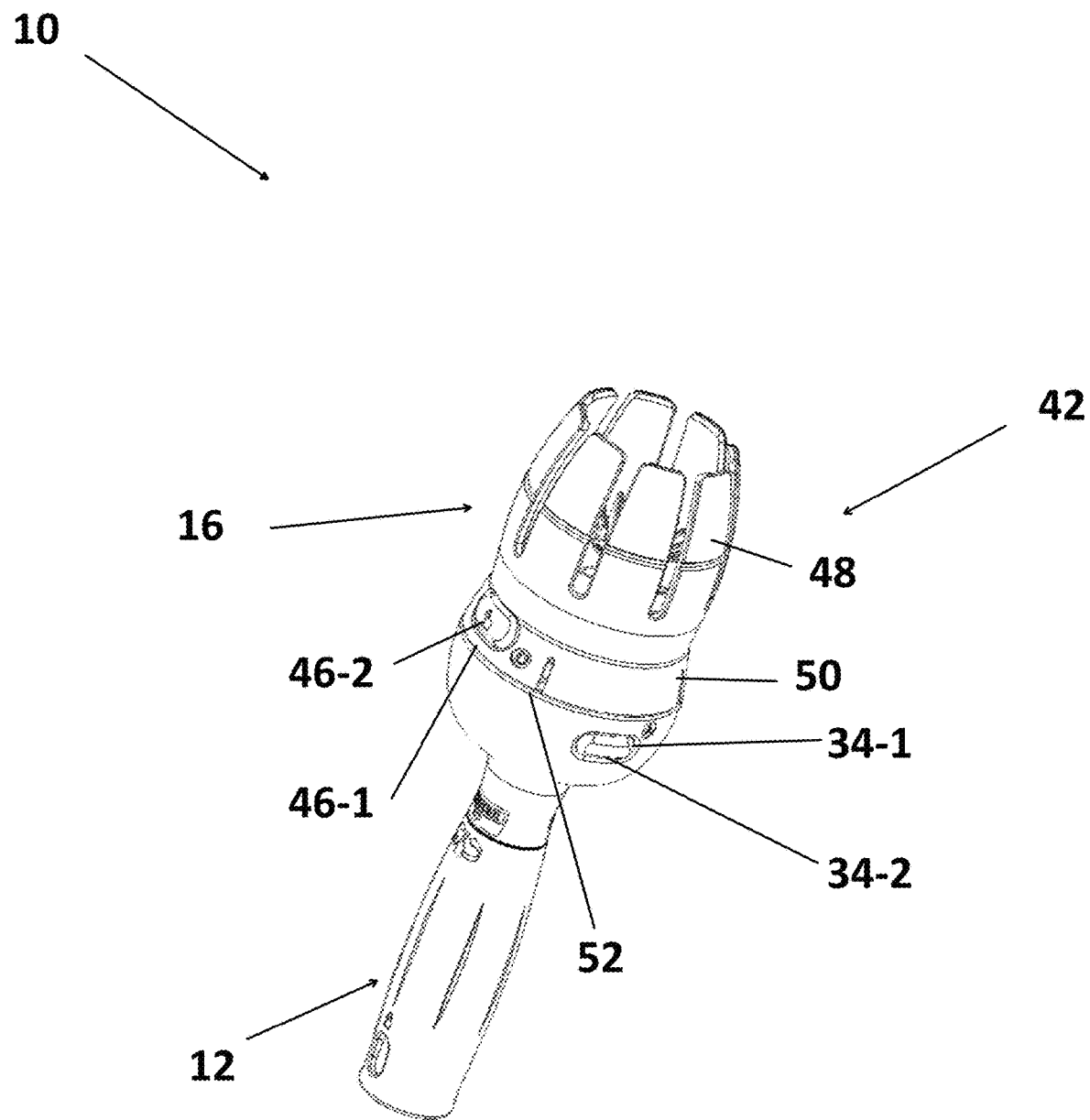
FIG. 7 is a top perspective view of the assembly of FIG. 4 in use with a third resilient finger holder.
Figure 8:
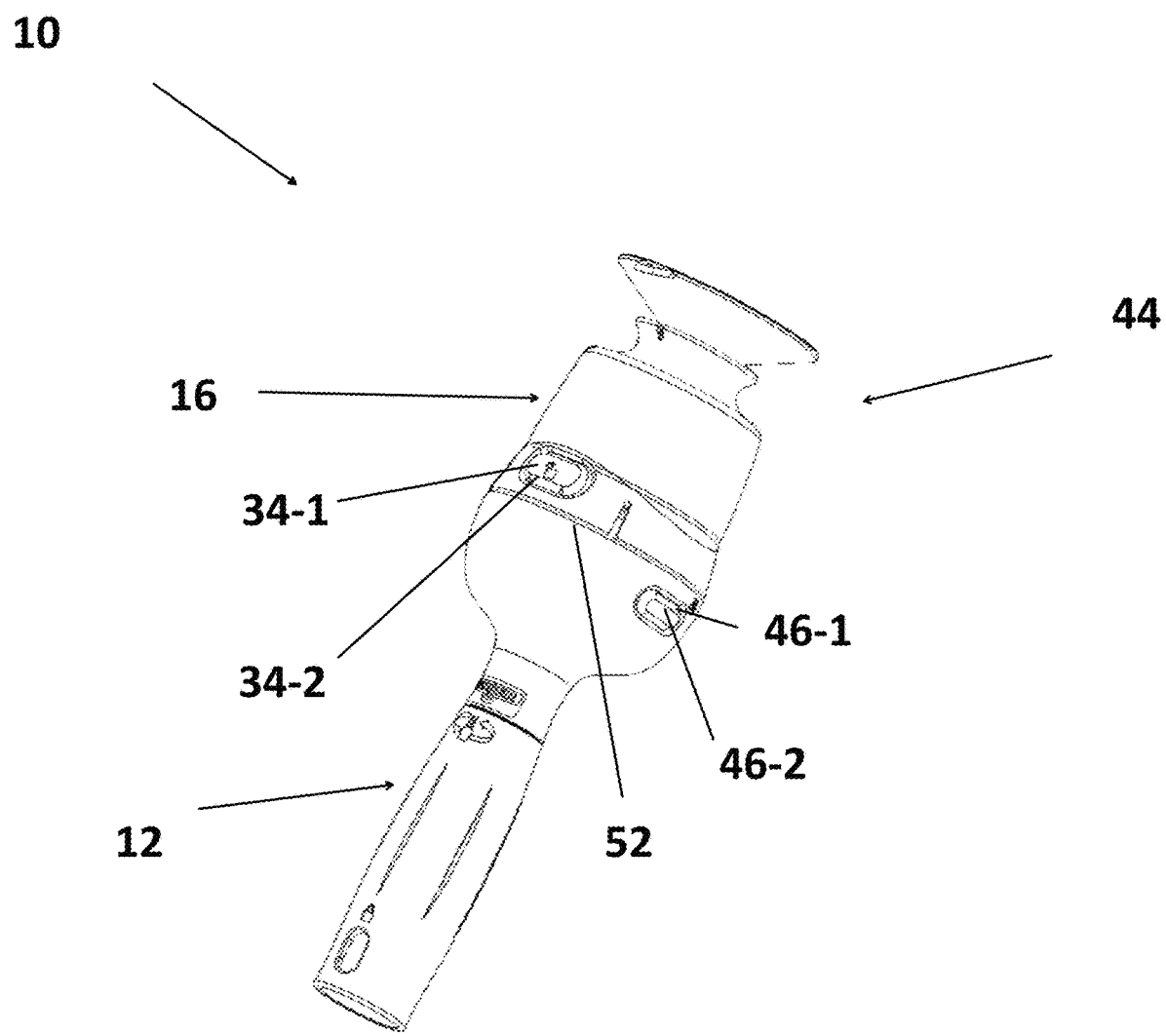
FIG. 8 is a bottom perspective view of the assembly of FIG. 1 configured for use with a suction holder.

In some embodiments, handle 12 can include a bulb holding device 16, in the form of broken bulb holder 26—seen in FIGS. 2 and 3. Broken bulb holder 26 can be integrally formed with handle 12 or connected thereto in any desired manner. Holder 26 includes a pair of resilient teeth 28 having crenulations 30 and a filament gap 32 positioned between the teeth. In use, holder 26 can be pressed into a broken light bulb such that teeth 28 provide a gripping force between crenulations 30 and a portion of the broken bulb—where this gripping force is sufficient to also transmit a rotational force to the broken bulb. In this position, any filament or internal region of the broken bulb can be received in gap 32.

Advantageously, top region 24 of handle 12 is formed as a widened region around holder 24. In this manner, any glass or debris from the broken bulb can be captured or caught by top region 24.

In some embodiments holder 26 is made of metal (e.g., steel, iron, aluminum) and is integrally formed with handle 12—such as being molded into the handle. Handle 12 can be made of electrically non-conductive mater such as, but not limited to molded plastic such as, but not limited to, polypropylene (PP), acrylonitrile butadiene styrene (ABS), polyoxymethylene (POM), polyamide (PA), polyethylene (PE), and others.

Handle 12 includes one or more connectors 34-1 at top region 24 (two shown) that removably mate with a corresponding number of connectors 34-2 of common base 14 as in FIGS. 1-4. In the illustrated embodiment, connectors 34-2 are resiliently flexible to allow removable engagement with connectors 34-1. Of course, it is contemplated by the present disclosure for connectors 34-1, 34-2 to take any desired form sufficient to prevent relative movement of handle 12 and common base 14 with respect to one another along the longitudinal axis (A).

In some embodiments, connectors 34-1, 34-2 are also configured to prevent relative rotation of handle 12 and common base 14 with respect to one another about the longitudinal axis (A). Further, it is contemplated for handle 12 and common base 14 to include one or more complementary features—either alone or together with connectors 34-1, 34-2—that prevent relative rotation of handle 12 and common base 14 with respect to one another about the longitudinal axis (A).

In embodiments where handle 12 includes holder 26, the holder is received or housed in a cavity 36 (FIG. 12) of base 14 when the base and handle are connected to one another. In this manner, assembly 10 is referred to as securing holding device 16 (in this instance holder 26) in a "nested manner" within base 14. As used herein, the term "nested manner" shall mean that one component of assembly 10 fits at least partially inside another component along a longitudinal axis (A) of the assembly.

Without wishing to be believed by any particular theory, the nesting of holding devices 16 within base 14 and within one another as described hereinbelow, allows assembly 10 to provide an easy to use device that is compact and maintains the various components together when not in use.

In addition to holder 26, assembly 10 includes one or more other types of bulb holding devices 16 secured together in a nested manner as shown in FIGS. 1 and 2.

For example, assembly 10 can include one or more resilient finger holders 38, 40, 42 (three shown) and a suction cup holder 44. During storage, holder 38 is removably secured to base 14—for example, by a connection between a surface of the holder 38 and a surface of the base 14; holder 40 is removably secured to holder 38—for example, by a connection between a surface of holder 38 and a surface of the holder 40; holder 42 is removably secured to holder 40—for example, by a connection between a surface of holder 40 and a surface of the holder 42; and suction cup 44 is removably secured to holder 42—for example, by a connection between a surface of suction cup 44 and a surface of the holder 42. When assembled for storage in this manner, assembly 10 occupies significantly less space along the axis A.

As will become apparent from further description of assembly 10, the assembly maintains at least one holding device 16 (e.g., holders 26, 38, 40, 42, 44) in the nested configuration during use of the remaining holding devices.

Figure 9A:
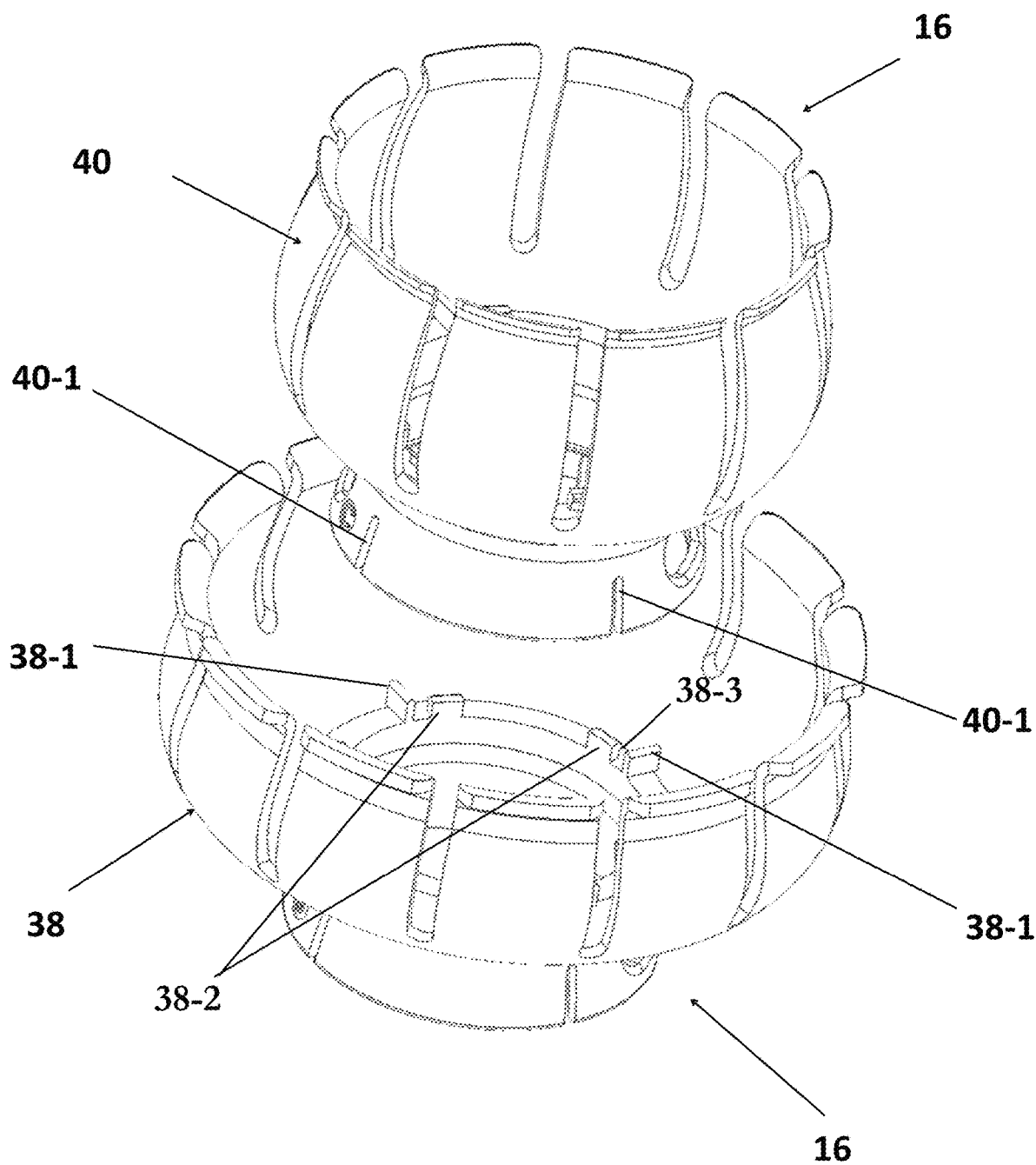
FIG. 9a is a top perspective view of the first and second resilient finger holders before/after nesting.

It is further contemplated by the present disclosure for assembly 10 to be configured—in some embodiments—so that more than one holding device 16 can remain secured in the nested configuration during use. One or more of holding devices 16—can include features that prevent rotation about axis A with respect to one another during use—an example of which is shown in FIG. 9a. In FIG. 9a, holder 40 is removably secured to holder 38—for example, by a friction fit between an inner surface of holder 38 and an outer surface of the holder 40 as discussed above. Additionally, holder 40 includes one or more notches 40-1 defined at open bottom 52, while holder 38 includes a corresponding number of tabs 38-1. During assembly, tabs 38-1 are received in notches 40-1 to prevent relative rotation. Additionally, notches 40-1 are believed to provide a resilience to open bottom 52 that applies an elastic force to provide a friction fit between an inner surface of holder 38 and an outer surface of the holder 40, which can form the connection between the holders.

Thus, in some embodiments the connection between devices 16 in the nested position can be a friction fit between the holders that allows or prevents rotation about the longitudinal axis (A).

Figure 9B:
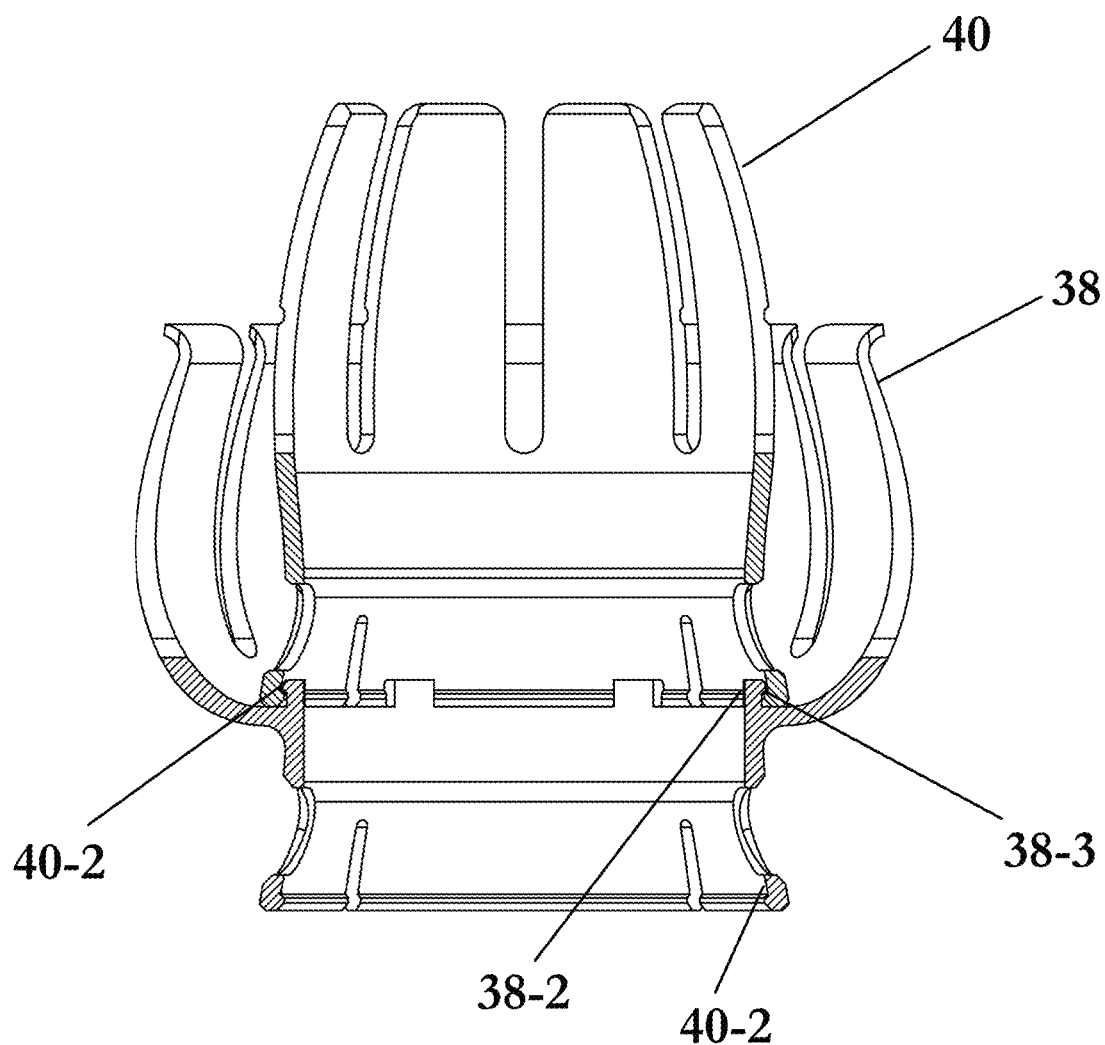
FIG. 9b is a sectional view of the first and second resilient finger holders during nesting.

Of course, it is contemplated by the present disclosure for the connection between nested holders to be formed by any possible removable connection. For example and in the embodiment shown in FIG. 9b, holder 40 includes an undercut 40-2 defined at open bottom 52, while holder 38 includes one or more tabs 38-2 having a connecting edge 38-3 (also seen in FIG. 9a). During nesting/disassembly, tabs 38-2 and/or open bottom 52 due to notches 40-1 can resiliently flex so that edges 38-3 and undercut 40-2 connect/disconnect holders 38/40 from one another.

Finger holders 38, 40, 42—as well as suction holder 44—can each be separately secured to base 14 in a manner that allows the holders to remove/install light bulbs of different sized and/or shapes as shown in FIGS. 5-8, respectively. Here, holders 38, 40, 42, 44 each include one or more connectors 46-1 (two shown) that removably mate with a corresponding number of connectors 46-2 of common base 14 as in FIGS. 1-4. In the illustrated embodiment, connectors 46-2 are resiliently flexible to allow removable engagement with connectors 46-1. Of course, it is contemplated by the present disclosure for connectors 46-1, 46-2 to take any desired form sufficient to prevent relative rotation of common base 14 and holders 38, 40, 42, 44 with respect to one another about axis A.

Thus, assembly 10 includes at least two different types of bulb holding devices 16 (three different types shown, with three sizes of one type being illustrated) that are removably connected to one another in a nested manner. The bulb holding devices 16 can include one or more of a broken bulb holder 26 (one shown), one or more resilient finger holders 38, 40, 42 (three shown), and one or more suction holders 44 (one shown).

Resilient finger holders 38, 40, 42 each include a number of integrally formed resilient fingers 48 depending from a central region 50, which has an open bottom 52. In some embodiments, fingers 48 can include a tapered leading edge 54 to assist in resiliently biasing the fingers around light bulbs. Resilient fingers 48 are configured to apply a gripping force to the light bulb to press the light bulb into common base 14, as well as orientate and hold the bulb prior to use, during insertion and/or during and after removal of the bulb from the socket. In some embodiments, the gripping force of FIGS. 48 can be sufficient to transmit a rotational force from assembly 10 to install/remove a light bulb. In other embodiments, common base 14 is configured to transmit the rotational force from assembly 10 to install/remove the light bulb. In still other embodiments, fingers 48 and common base 14 cooperate to transmit the rotational force from assembly 10 to install/remove the light bulb.

Figure 10:
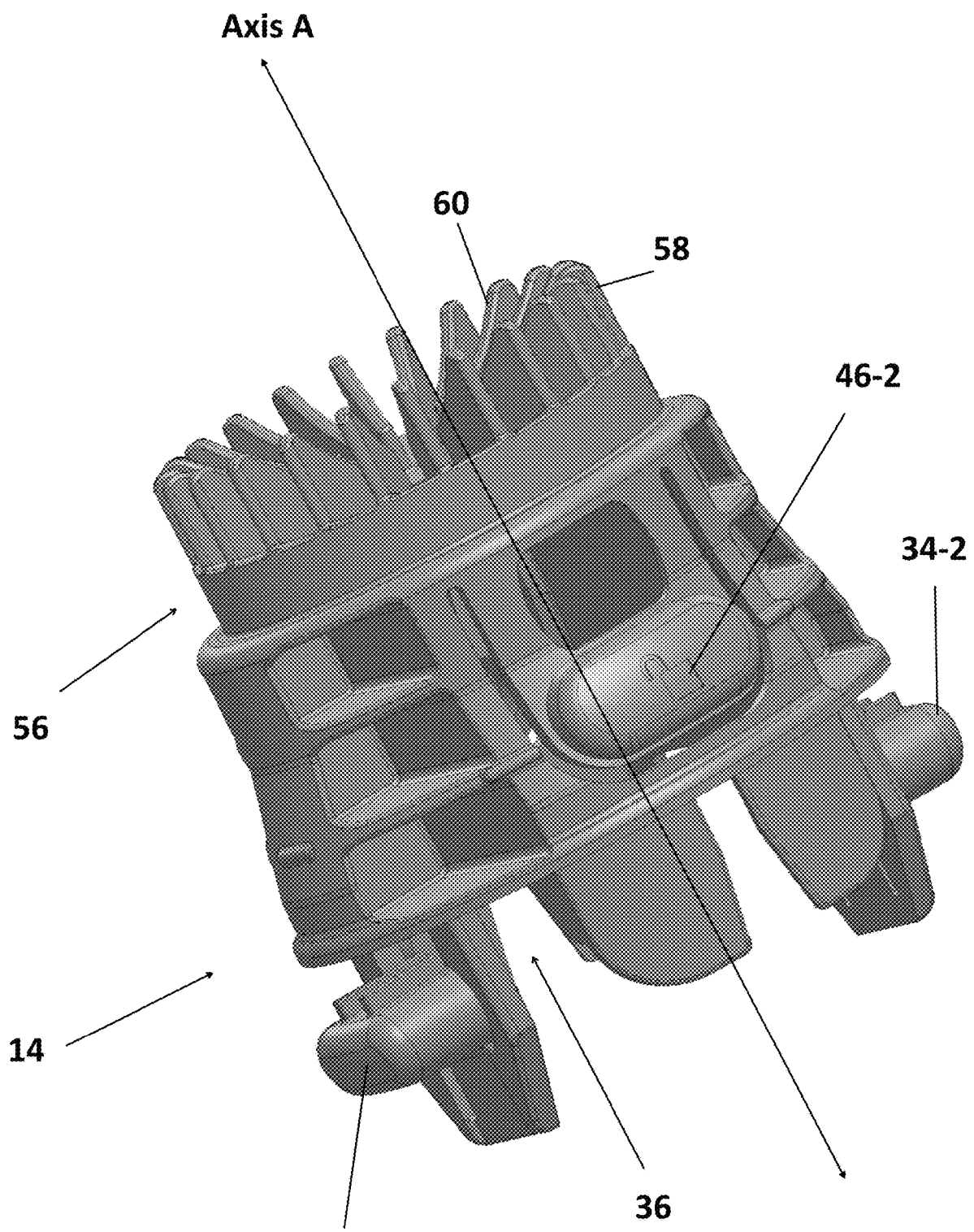
FIG. 10 is a side perspective view of a common base of the assembly of FIG. 1.
Figure 11:
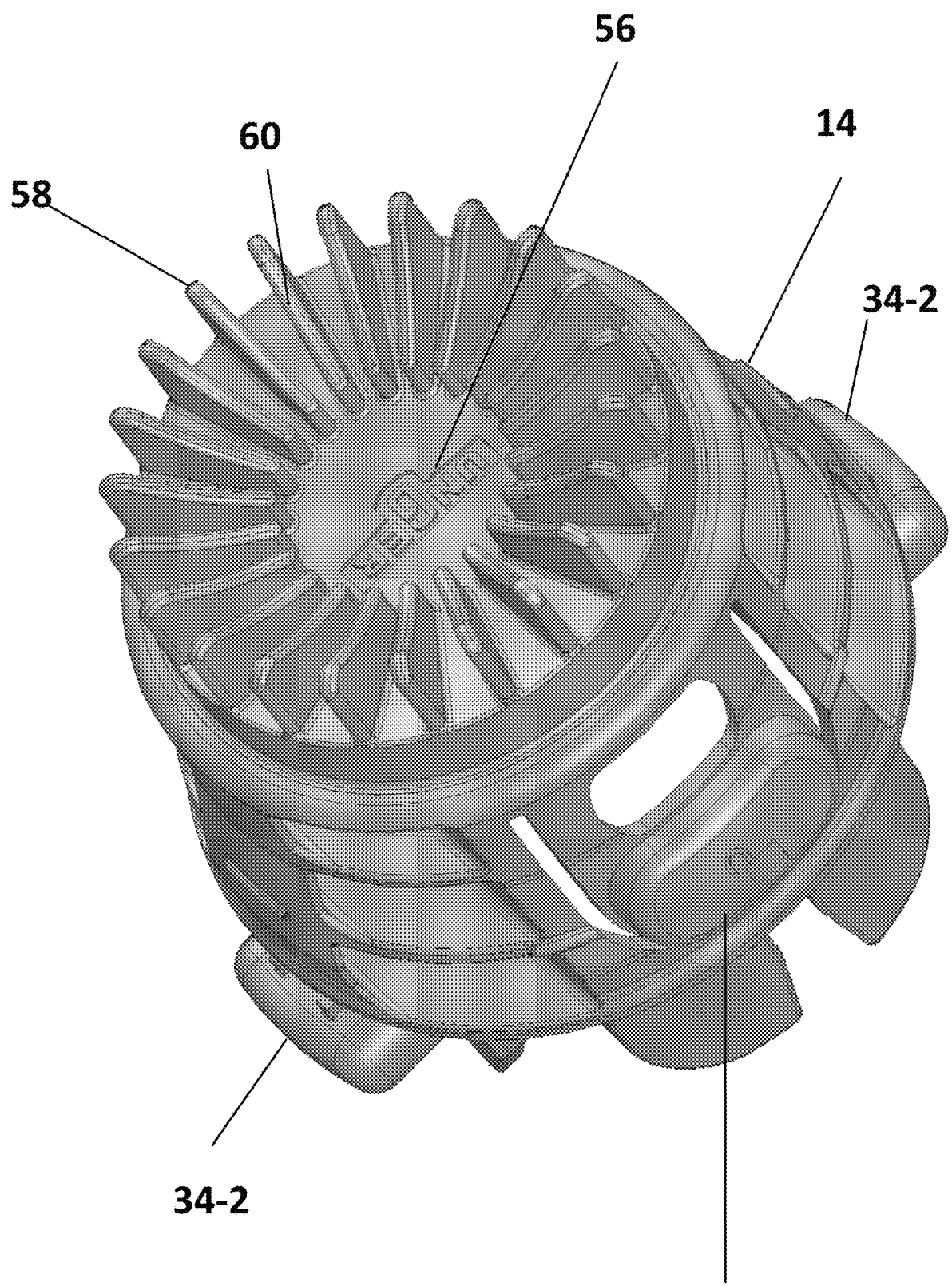
FIG. 11 is a top perspective view of the common base of FIG. 10.
Figure 12:
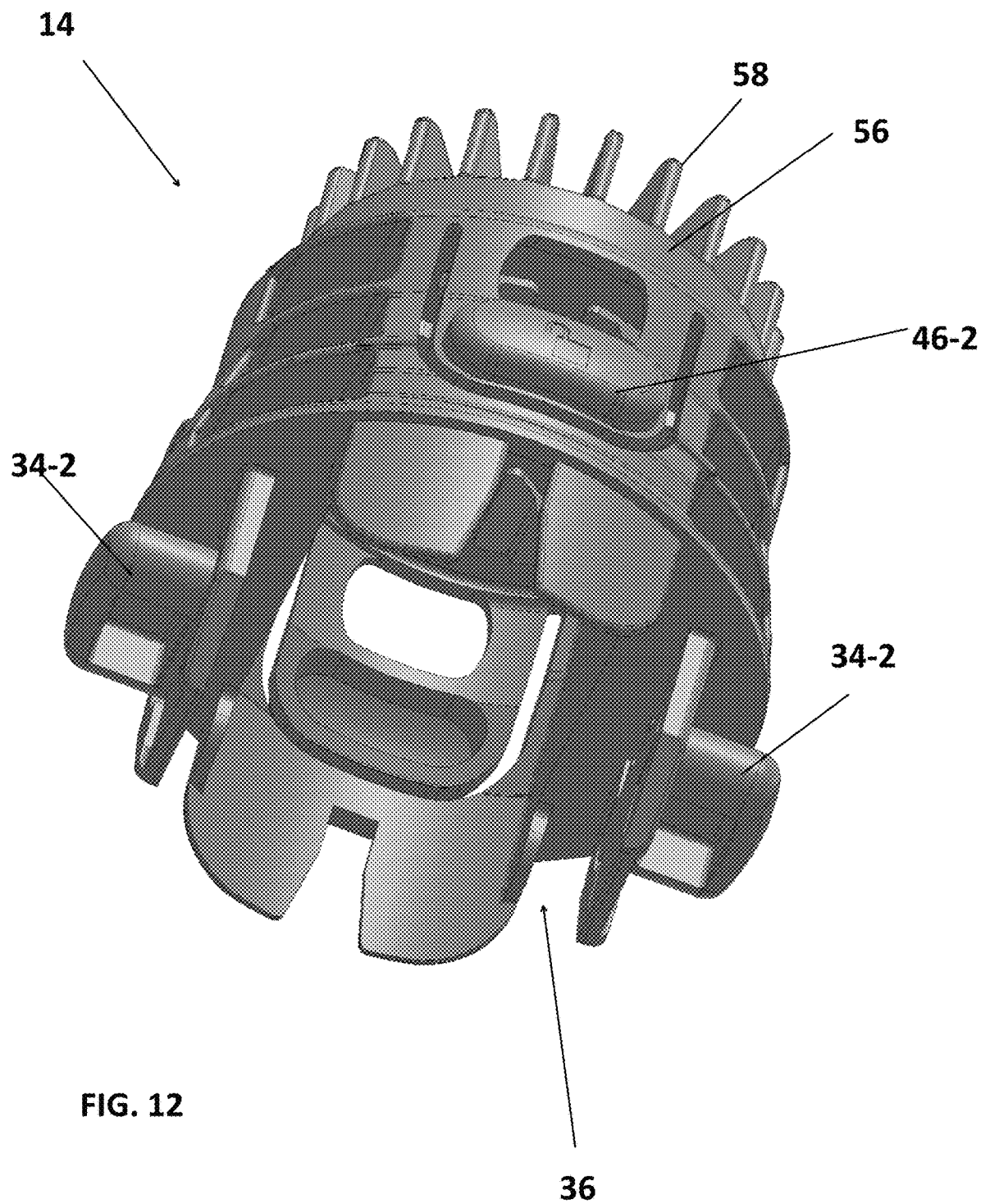
FIG. 12 is a bottom perspective view of the common base of FIG. 10

The configuration of central region 50 and open bottom 52 allow holders 38, 40, 42, to be nested within one another in the manner discussed above. Additionally and when a respective one of the holders 38, 40, 42 is removably secured to common base 14, open bottom 52 is closed by the common base 14. Advantageously and as shown in FIGS. 10-12, common base 14 can include an additional feature 56 that is configured to supplement the transmission of rotational forces from resilient finger 48 to the light bulb. Additional feature 56 can be an adhesive member, a frictional member, a suction cup member, and any combinations thereof.

In some embodiments and as illustrated, feature 56 includes a plurality of flexible members 58. Here, feature 56 can be formed, for example, of a thermoplastic polyurethane (TPU), thermoplastic rubber (TPR), or thermoplastic elastomer (TPE) that is connected to, bonded to, or over molded on common base 14, which can be formed of molded plastic such as, but not limited to, polypropylene (PP), acrylonitrile butadiene styrene (ABS), polyoxymethylene (POM), polyamide (PA), polyethylene (PE), and others. In some examples, feature 56 can be formed of a material having a durometer of between 20 and 90, while in other examples the feature can be formed of a material having a durometer of between 30 and 70.

Members 58 can be upstanding members that extend along axis A and have an upper end 60 that is adapted to meet the curvature of bulbs received therein. For example, in some embodiments, members 58 are linear members that are radially directed inward towards axis A, where the members are tapered on upper end 60 inward toward axis A.

Figure 13:
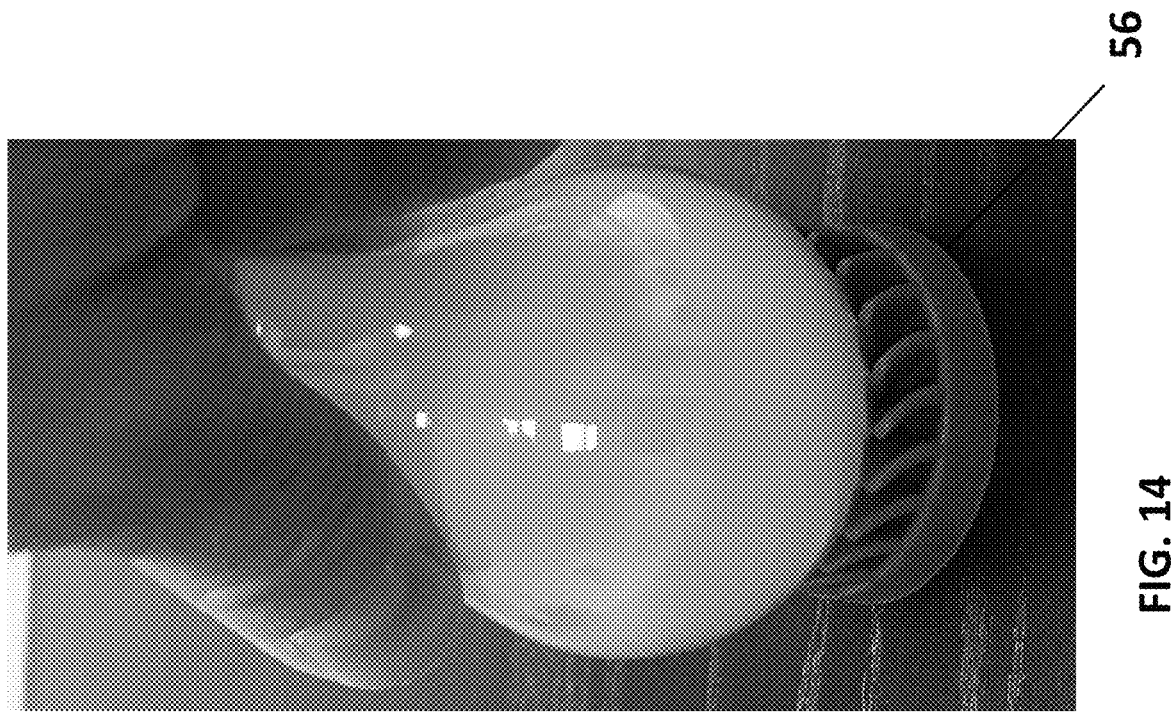
FIGS. 13-14 illustrate an exemplary embodiment of a feature of the present disclosure in use with a light bulb of a first size.
Figure 14:
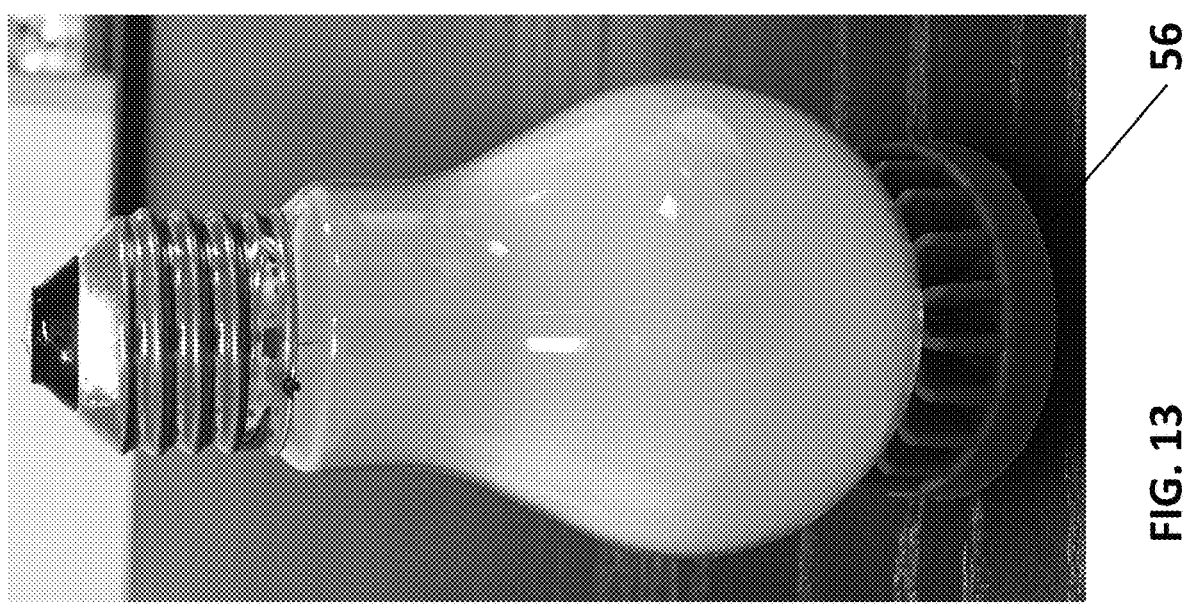
Figure 15:
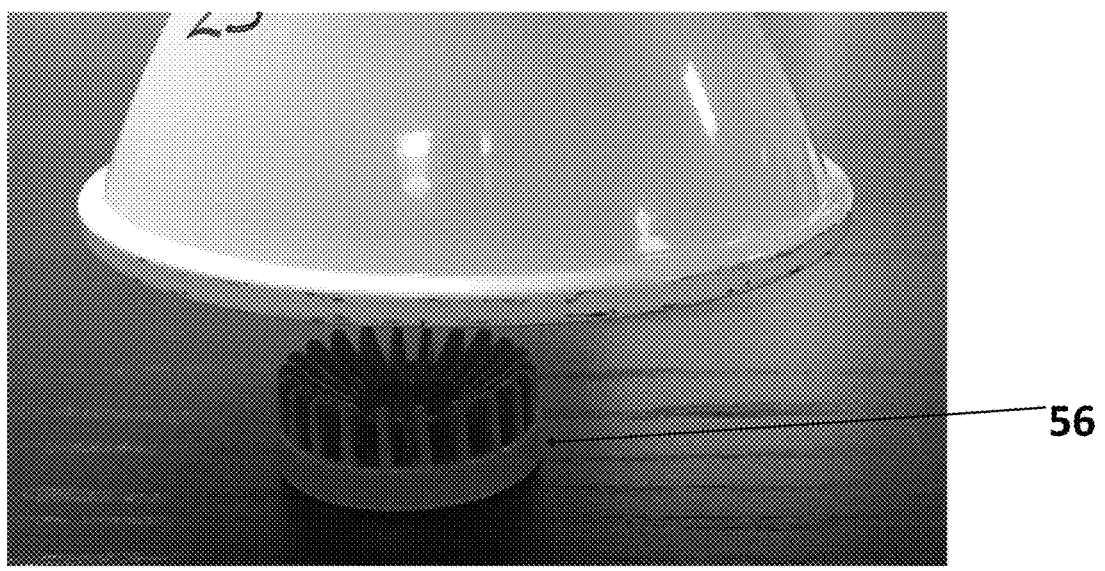
FIGS. 15-17 illustrate the feature of FIGS. 13-14 in use with a light bulb of a second size.
Figure 17:
Figure 16:
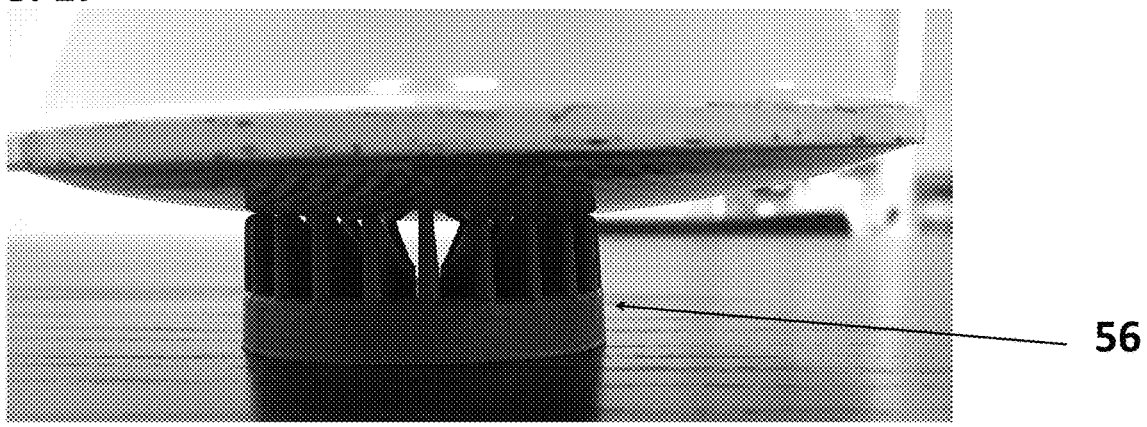

FIGS. 13-14 illustrate feature 56 in use with a light bulb of a first size, where the first size is shown by way of example as an A19, which is a common residential bulb size. FIGS. 15-17 illustrate feature 56 in use with a light bulb of a second size, where the second size is shown by way of example as flood bulb, which is another common residential bulb size. Here, it can be seen that members 58 deform depending on the curvature of the bulb where standard bulbs such as the A19 or smaller radiused bulbs shown in FIGS. 13-14, the members flex during compression and rotation. Additionally and with larger radiused bulbs (e.g., flood) of FIGS. 15-17, members 58 are flexed more and fold over to increase the surface area of contact.

In other embodiments, members 58 are concentric circles having differing heights as the concentric circles approach axis A.

Thus, feature 56 can be configured to conform to the shape of the light bulb. As used herein, the term conform shall mean that feature has one or more of a taper (i.e., when linear member), differing heights (i.e., when circular members), and is deformable. Moreover when feature 56 deforms to conform to the shape of the bulb, it is contemplated for this deformation to occur only during application of the rotational force—namely during installation/removal of the light bulb.

In some embodiments, assembly 10 is provided in a kit—that includes handle 12, common base 14, one or more of holding device 16, and, optionally, pole 18 and the locking cone.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A light bulb removing and installing assembly, comprising:
a first bulb holding device and a second bulb holding device, wherein the first bulb holding device is different in at least one of a size and shape from the second bulb holding device, at least one of the first bulb holding device and a second bulb holding device having an interior area for receiving a light bulb and each of the first bulb holding device and the second bulb holding device having a portion configured to apply at least a gripping force to the light bulb, wherein the second bulb holding device is connectable to the first bulb holding device for storage;
a handle; and
a common base removably connectable to the handle and removably connectable to each of the first bulb holding device and the second bulb holding device independently, wherein when the common base is connected to at least one of the first bulb holding device and the second bulb holding device, a portion of said common base is arranged within the interior area and the common base has a feature configured to provide at least a portion of the rotational force to the light bulb.

2. The assembly of claim 1, wherein the common base further comprises an open bottom, the common base being removably connectable to each bulb holding device so that the common base applies the rotational force through the open bottom.

3. The assembly of claim 1, further comprising a pole securable to the common base.

4. The assembly of claim 1, wherein the common base is removably connected to the handle in a manner that prevents rotation of the handle and the common base with respect to one another about a longitudinal axis (A).

5. The assembly of claim 4, wherein the handle has a middle region and a top region, the middle region being configured to receive a hand of a user and the top region removably connecting the handle to the common base.

6. The assembly of claim 5, further comprising a pole, wherein the handle further comprises a bottom region configured to secure the common base to the pole in a manner that prevents rotation of the handle and the pole with respect to one another about the longitudinal axis (A).

7. The assembly of claim 5, wherein the top region comprises a broken bulb holder, the broken bulb holder nesting into the common base when the handle and the common base are removably connected to one another.

8. The assembly of claim 7, wherein the broken bulb holder comprises a pair of resilient teeth having crenulations and a filament gap positioned between the pair of resilient teeth.

9. The assembly of claim 7, wherein the top region has as a widened region around the broken bulb holder so as to capture or catch glass or debris from a broken bulb.

10. The assembly of claim 1, wherein the feature conforms to a curvature of the light bulb.

11. The assembly of claim 1, wherein the feature comprises a plurality of upstanding flexible members, wherein the plurality of upstanding flexible members are linear members that are radially directed inward towards a longitudinal axis or are concentric circles having differing heights as the concentric circles approach the longitudinal axis.

12. The assembly of claim 1, wherein the feature is selected from the group consisting of an adhesive member, a frictional member, a suction cup member, a plurality of upstanding flexible members, and any combinations thereof.

13. The assembly of claim 2, wherein an open bottom of one of the two bulb holding devices is configured to be removably connected to the other of the two bulb holding devices in a nested manner.

14. The assembly of claim 2, wherein an open bottom of one of the two bulb holding devices has a surface that forms a removable connection with a surface of the other of the two bulb holding devices.

15. The assembly of claim 1, wherein the two bulb holding devices are holders selected from the group consisting of a resilient finger holder having a number of resilient fingers, a suction holder, a broken bulb holder, and any combinations thereof.

* * * * *